United States Patent [19]

Lupo

[11] Patent Number: 5,225,943
[45] Date of Patent: Jul. 6, 1993

[54] REAR VIEW MIRROR UNIT FOR A VEHICLE

[75] Inventor: Elio Lupo, Turin, Italy

[73] Assignee: Gilardini S.p.A., Turin, Italy

[21] Appl. No.: 454,767

[22] Filed: Dec. 21, 1989

[30] Foreign Application Priority Data

Dec. 23, 1988 [IT] Italy ............................. 68152 A/88

[51] Int. Cl.⁵ .......................... G02B 7/18; B60R 1/06
[52] U.S. Cl. .................................... 359/841; 359/872;
359/881; 248/476; 248/479; 248/486;
248/289.1
[58] Field of Search .............. 350/604, 605, 606, 631,
350/632, 639; 248/476, 479, 486, 289.1, 291;
74/502.1; 359/841 (U.S. only), 872 (U.S. only),
881 (U.S. only)

[56] References Cited

U.S. PATENT DOCUMENTS

| | | | |
|---|---|---|---|
| 2,642,244 | 6/1953 | Beach, Jr. | 248/291 |
| 3,059,790 | 10/1962 | Augustus | 350/604 |
| 3,166,283 | 1/1965 | Farnsworth | 350/632 |
| 3,220,129 | 11/1965 | Goodman et al. | 248/476 |
| 3,377,880 | 4/1968 | Carter, Jr. | 350/604 |
| 3,536,382 | 10/1970 | McKee et al. | 350/605 |
| 4,077,597 | 3/1978 | Greig | 248/479 |
| 4,157,862 | 6/1979 | Jackson | 350/627 |
| 4,776,231 | 10/1988 | Cummins et al. | 248/476 |

FOREIGN PATENT DOCUMENTS

| | | | |
|---|---|---|---|
| 0451974 | 9/1950 | Italy | 248/475.1 |
| 0011936 | 1/1984 | Japan | 350/632 |

Primary Examiner—Bruce Y. Arnold
Assistant Examiner—R. D. Shafer
Attorney, Agent, or Firm—Gifford, Groh, Sprinkle, Patmore and Anderson

[57] ABSTRACT

A rear view mirror unit for a commercial vehicle, comprising a mirror, a support element to which this mirror is fixed, pivot means for connecting the support element in such a manner as to project from at least one region of the vehicle body defining at least one preferential angular position of the support element itself with respect to the body, and a cable slidably engaging a bushing fixed to the support element and connected to a coil spring with its front end, the free ends of the cable and the spring are connected to respective brackets fixed to the body to the sides of the said pivot means.

8 Claims, 2 Drawing Sheets

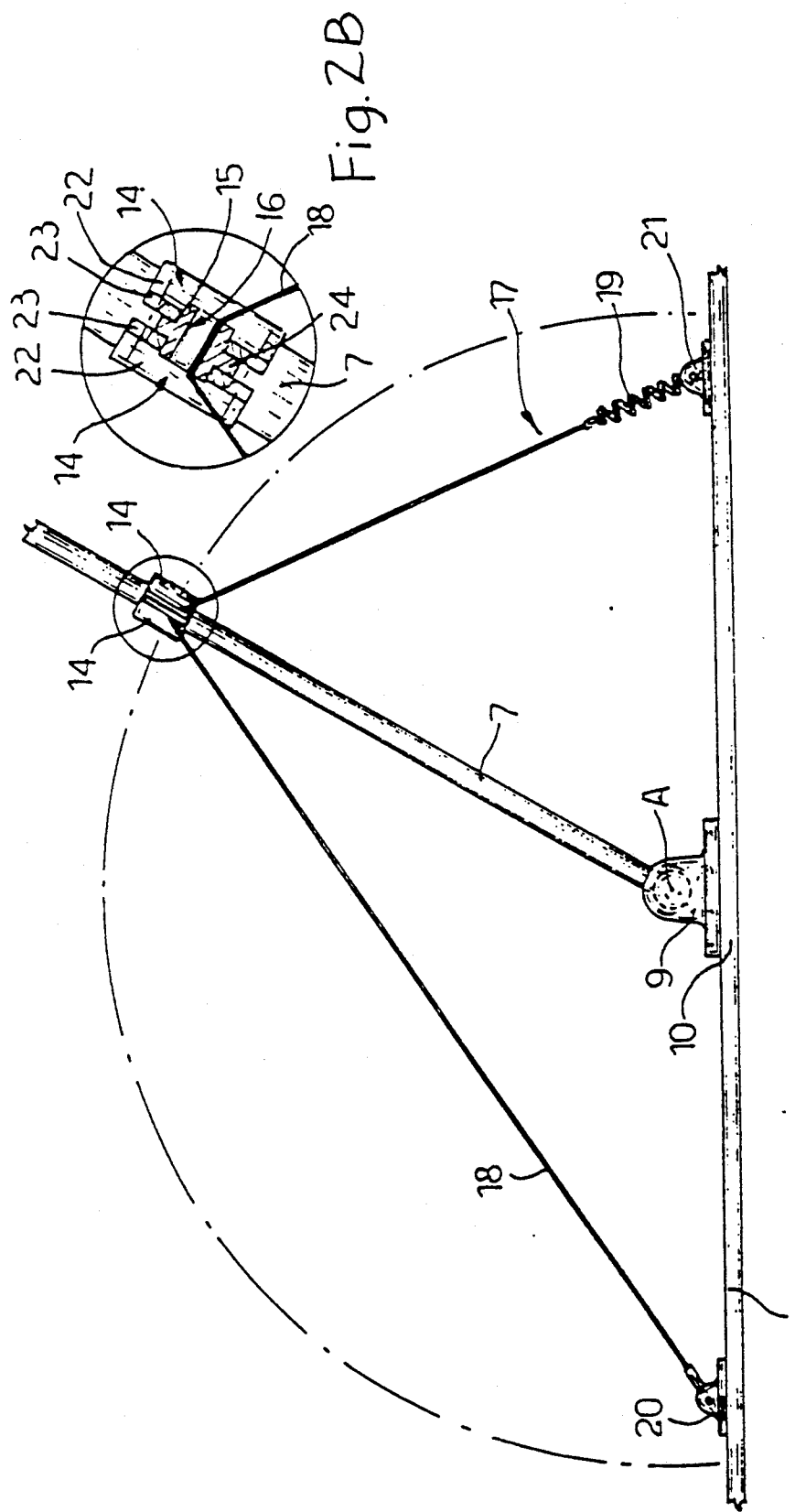

REAR VIEW MIRROR UNIT FOR A VEHICLE

BACKGROUND OF THE INVENTION

The present invention relates to a rear view mirror unit and particularly, but not exclusively, to an external rear view mirror unit for a commercial vehicle.

As is known, external rear view mirror units of commercial vehicles generally comprise a substantially C-shape support element adapted to be pivoted at its ends to a side portion of the vehicle body, and a mirror fixed to a central portion of the support element itself.

At least one of the points of connection of the support element to the body is constituted by a pivot adapted to define at least one preferential stable position of the support element with respect to the vehicle body.

External rear view mirror units of the known type briefly described have one disadvantage. During running of the vehicle vibrations are produced which become transmitted to the support element from the body and are amplified by this because of its projecting arrangement and therefore cause oscillation of the mirror and of the image reflected in it.

SUMMARY OF THE INVENTION

The object of the present invention is that of providing an external rear view mirror unit for a commercial vehicle, which allows the disadvantage connected with known rear view mirror units specified above to be overcome.

The said object is achieved by the present invention in that it relates to a rear view mirror unit for a commercial vehicle, of the type comprising a mirror, a support element to which the said mirror is fixed, and pivotal connection means for connecting the said support element so as to project from at least one region of the body of the said vehicle, the said pivotal means defining at least one preferential angular position of the said support element with respect to the said body, characterised by the fact that it includes at least one flexible restraint element of elongate form slidably coupled to the said support element and fixed at its respective ends to the said body at opposite sides of the said pivot means, the said restraint element including at least one resiliently deformable portion.

BRIEF DESCRIPTION OF THE DRAWINGS

For a better understanding of the present invention a preferred embodiment is described hereinbelow purely by way of example and with reference to the attached drawings, in which:

FIG. 2A is a partial view from below, on an enlarged scale, of the rear view unit of FIG. 1; and FIG. 2B is an enlarged sectional view of the brackets shown in FIG. 2A.

DETAILED DESCRIPTION OF THE INVENTION

Figure 1:
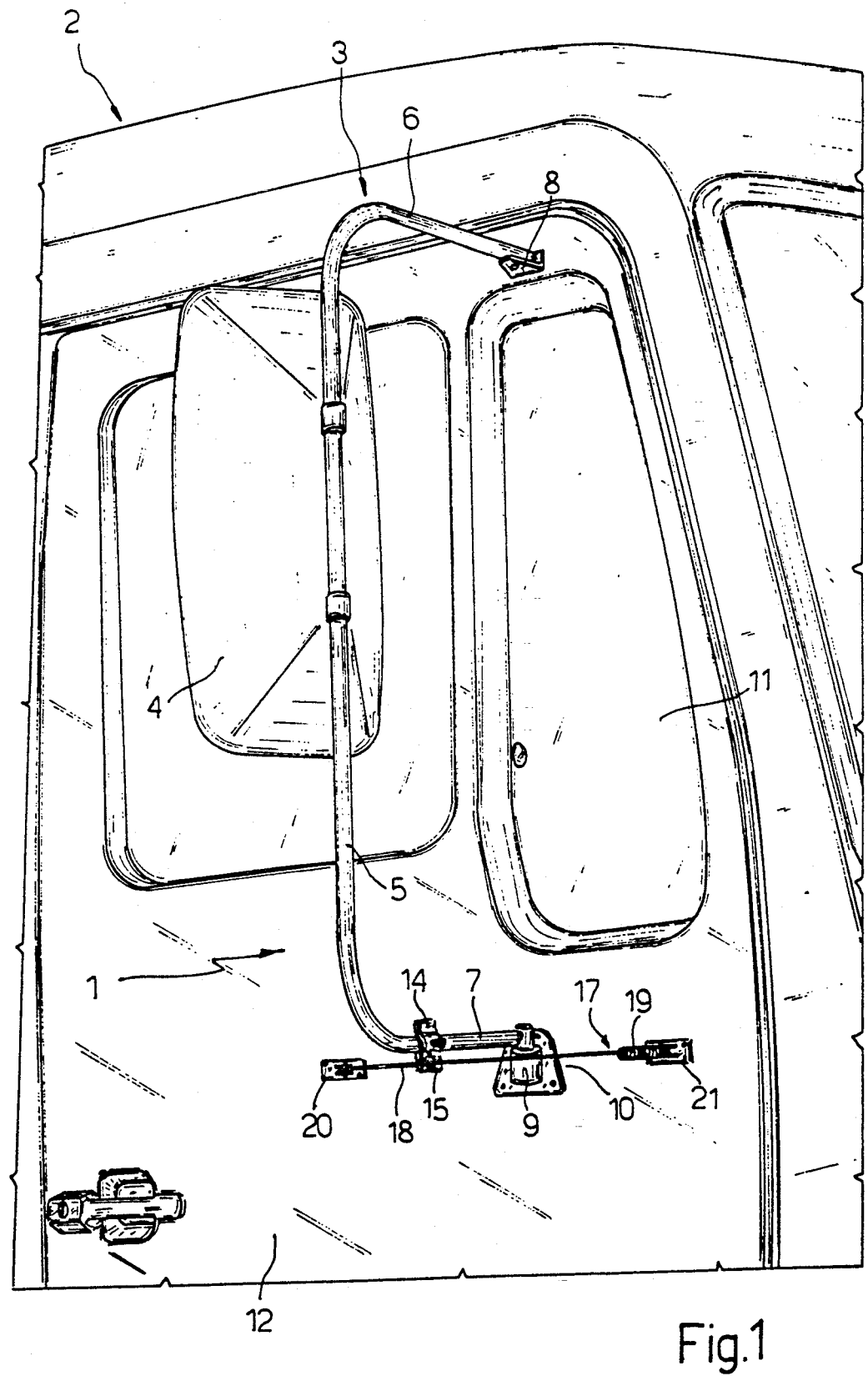
FIG. 1 is a perspective view of a rear view mirror unit for a commercial vehicle made according to the present invention.

With reference to the drawings (FIG. 1), the reference numeral 1 generally indicates a rear view mirror unit adapted to be fitted to a commercial vehicle 2 only partially illustrated.

The unit 1 comprises, in a known way, a support element 3 pivotally connected to the body of the vehicle 2 so as to project therefrom, and a mirror 4 fixed to this support element 3.

In particular the support element 3 is made of metal tube bent substantially to a C-shape and includes a central vertical portion 5 to which the mirror 4 is fixed in an orientatable manner, and upper and lower approximately horizontal arms 6, 7 which are pivoted at their free ends respectively to a bracket 8 and to a support 9 fixed to the body of the vehicle 2 and defining an axis of rotation A (FIG. 3A) of the support element 3 itself.

In particular, the support 9, known per se, is fixed at a first portion 10 of the body, conveniently beneath a side window 11 of a door 12 of the vehicle, and is of the type adapted to define at least one preferential angular position (or normal use position) of the support element 3 with respect to the vehicle body 2; this position, illustrated in the drawings, is conveniently inclined forwardly with respect to a transverse plane of the vehicle containing the axis A.

The support element 3 can rotate forwardly and rearwardly with respect to the preferential position to allow the rear view mirror unit 1 to be folded back against the body when required, or in the case of impacts.

On a portion of the lower arm 7 opposite the support 9 (FIG. 2B) there is fixed, by means of a pair of metal brackets 14, a cylindrical bush 15 of plastics material, preferably nylon, defining a through cavity 16 the axis of which is orthogonal to the axis of the arm 7 itself. In particular, the brackets 14 comprise respective substantially semi-circular portions 22 opposite sides of the arm 7, and respective pairs of lateral flat tongues 23 clamped together in pairs by means of screws only the axes of which are illustrated in the enlarged detail of FIG. 2; the bush 15 is housed at its ends in corresponding holes of respective tongues 23 of the brackets 14 and has a peripheral central projection 24 locked between the tongues 23.

According to the present invention the unit 1 includes an auxiliary restraint element 17 for connecting the support element 3 to the body 2. This restraint element 17 in particular comprises a flexible cable 18 conveniently of steel clad in plastics material, and a coil spring 19 fixed to one end of this cable.

The cable 18 is free to slide within the bush 15 and is connected at its free end, for example hooked, to a bracket 20 fixed onto the body in a zone adjacent the support 9 and displaced with respect to it towards the rear part of the vehicle. The spring 19 is connected at its free end, for example by hooking, to a further bracket 21 fixed to the body in a position to one side of the support 9 and displaced with respect to it towards the front of the vehicle. The length of the cable 18 and of the spring 19 are calculated in such a way that the spring 19 is tensioned when the support element 3 is located in the preferential position defined by the support 9; the resilient load of the spring, in these conditions, must not however be such as to compromise the stability of this position.

The operation of the unit 1 is as follows.

The tension exerted by the spring 19 on the cable 18 produces, substantially by the frictional contact between the cable 18 and the bush 15, a strong damping action on the vibrations which are produced in use on the support element 3.

If the support element 3 is pushed forwardly, in a clockwise sense with reference to FIG. 2, the rotation continues for a first section encouraged by the spring 19, which becomes progressively untensioned, after which the resilient load is nullified and the element can turn as if the restraint element 17 did not exist.

When the support element 3 is turned rearwardly there is first of all caused an increase in the deformation of the spring 19 and consequently rotation is resisted; this deformation then progressively diminishes until the spring 19 becomes untensioned and in the last section of the rotation the element 17 is again of no influence.

From a study of the unit 1 formed according to the present invention the advantages which it allows to be obtained are evident.

In particular, the restraint element 17 eliminates or strongly attenuates the vibrations in use of the support element 3, allowing a substantially stationary image to be seen in the mirror 4; moreover, the restraint element 17 allows the complete folding of the support element 3 forwardly or rearwardly following an unexpected impact or a voluntary manual intervention.

Finally, it is clear that the unit 1 described can have modifications and variations introduced thereto without departing from the protective ambit of the present invention.

For example, it is possible to vary the manner of fixing the bush 15 to the arm 7, the cable 18 to the bracket 20 and the spring 19 to the bracket 21; finally two restraint elements 17 can be used, fitted to respective arms 6 and 7 of the support 3.

What is claimed is:

1. A rear view mirror unit for a commercial vehicle, comprising:
    a mirror;
    a support element to which said mirror is fixed;
    a bracket connected to said support element, said bracket having a bushing, said bushing having a through cavity;
    pivotal means for connecting said support element to project from at least one region of a vehicle, said pivotal means defining at least one preferential angular position of said support element with respect to said vehicle,
    at least one flexible restraint element of elongate form, said at least one flexible restraint element being fixed at its respective ends to said vehicle at opposite sides of said pivotal means, and
    said at least one flexible restraint element including a cable slidable in said through cavity; said at least one flexible restraint element further including a spring attached to one of said respective ends of said cable.

2. The unit according to claim 1, wherein said spring is tensioned when said support element is located in said preferential position.

3. The unit according to claim 1, wherein said respective end of said cable opposite said other respective end is connected to a first bracket fixed to said vehicle on one side of said pivotal means and said spring is connected to a second bracket, said second bracket being fixed to said vehicle the opposite side of said pivotal means.

4. The unit according to claim 1, wherein said preferential position of said support element is inclined forwardly with respect to a transverse plane of said vehicle, said preferential position having an axis of rotation of said support element defined by said pivotal means.

5. The unit according to claim 1, wherein said spring is connected to one of said brackets disposed towards the front of said vehicle.

6. The unit according to claim 1, wherein said support element is substantially C-shape and includes a central portion to which said mirror is connected in an orientated manner, said support element further includes upper and lower arms attached by respective pivot means to said vehicle; said pivot means of said lower arm including a support defining said preferential position of said support element with respect to said vehicle.

7. The unit according to claim 6, wherein said at least one flexible restraint element is slidably coupled to said lower arm of said support element.

8. The unit according to claim 1, wherein said cable is steel cladded in a plastic material.

* * * * *